United States Patent
McKee

[11] 3,813,878
[45] June 4, 1974

[54] METHOD AND APPARATUS FOR REDUCING EMISSION OF POLLUTANTS IN EXHAUST GAS FROM INTERNAL COMBUSTION ENGINE

[76] Inventor: Joseph W. McKee, 570 North Hwy., Broomfield, Colo. 80020

[22] Filed: Mar. 22, 1972

[21] Appl. No.: 237,027

[52] U.S. Cl. .................... 60/303, 23/277 C
[51] Int. Cl. ............................... F01n 3/14
[58] Field of Search ............. 60/303, 290; 23/277 C

[56] References Cited
UNITED STATES PATENTS

| | | | |
|---|---|---|---|
| 2,938,593 | 5/1960 | Miller | 60/274 |
| 3,146,072 | 8/1964 | Morgan | 60/303 |
| 3,203,168 | 8/1965 | Thomas | 60/286 |
| 3,210,161 | 10/1965 | Soltau | 60/303 |
| 3,350,878 | 11/1967 | Lambert | 60/303 |
| 3,364,909 | 1/1968 | Mick | 60/290 |
| 3,430,437 | 3/1969 | Saussele | 60/290 |
| 3,524,316 | 8/1970 | McKee | 60/274 |
| 3,677,013 | 7/1972 | Bauger | 60/303 |

Primary Examiner—Douglas Hart
Attorney, Agent, or Firm—Duane Burton

[57] ABSTRACT

A system for reducing the emission of pollutants in the exhaust gas from an internal combustion engine characterized by an engine driven air pump which delivers air under pressure to an exhaust manifold, and an afterburner disposed downstream from a muffler which is provided with spark plugs energized by a vibrating type high voltage coil which provides continuous sparking across the spark plug gaps. The afterburner is constructed to prevent back pressure in the exhaust system and the spark plugs are disposed at points of high turbulence in the exhaust gas to promote substantially continuous ignition of combustibles with the added air.

3 Claims, 6 Drawing Figures

PATENTED JUN 4 1974  3,813,878

Fig. PA

METHOD AND APPARATUS FOR REDUCING EMISSION OF POLLUTANTS IN EXHAUST GAS FROM INTERNAL COMBUSTION ENGINE

BACKGROUND OF THE INVENTION

U.S. Pat. No. 3,524,316 discloses a system for minimizing the exhaust of pollutants to the atmosphere, now generally referred to as smog. While such system operates in the manner intended, it is somewhat expensive to retro-fit to automobiles presently in use, but which may require installation of a smog device to conform to vehicle codes, or the like, in that it requires a separate ignition distributor for an afterburner or muffler. While various smog devices have been devised which may be retro-fitted at somewhat nominal expense they have suffered the disadvantage of inefficiency in that an undesirable quantity of the pollutants are emitted to the atmosphere, thus providing only a partial, and less than completely satisfactory, solution to the problem.

Certain engines, particularly those furnished in 1968 model Ford and International vehicles, were provided with an engine driven air pump which delivered air to an exhaust manifold adjacent each exhaust valve. Such system, however, has now been superceded by others, possibly due to complications of installation and particularly in retro-fitting engines which were not factory equipped with such system. These pumps and their ancillary apparatus are still commercially available, however, and, since mass and economical production methods have been established, a source of supply exists which could be utilized and thus render same economically useable.

A source of supply of coils similar in construction to the Ford Model T ignition coils again exists which has probably come into existence due to the restoration of such automobiles. As originally used in the 4 cylinder Fords, four coils were employed, one for each cylinder, which were energized with a rotary switch, each coil having vibrating breaker points which provided a continuous spark during the period of contact of the rotary switch. Originally such coils were energized by a relatively low and variable voltage magneto and later by a six volt battery when the Model T became equipped with a battery and self-starter. Today's coils are designed to operate on a 6 volt D.C. supply but will operate on higher voltage, such as 12 volts or 24 volts which is now the normal voltage supply employed in the majority of automobiles. When so operated, their output voltage is increased thereby enabling the production of a hotter or higher voltage spark across a greater spark plug gap. The conventional air pump system and vibrating coil referred to form two of the readily available components employed in the present invention.

SUMMARY OF THE INVENTION

A conventional engine driven air pump, which may readily be retro-fitted to existing engines, is employed together with a vibrating coil available today. The pump supplies air to the exhaust manifold and the coil supplies continuous sparking across spark plugs affixed to an afterburner which may be readily installed in a muffler tail pipe without disturbing the muffler and exhaust pipe connecting the muffler to the exhaust manifold.

It is thus a principal objective of the invention to provide an anti-smog device which employs the components referred to above and a novel afterburner which may readily be installed in a tail pipe by merely removing a section of the tail pipe.

Another object of this invention is to provide a method and apparatus for substantially complete combustion of the combustible contaminants contained in the exhaust gas of an internal combustion engine having a conventional exhaust manifold exhaust pipe and muffler, said apparatus comprising an engine-driven air pump for delivering pressurized air to the exhaust manifold, whereby air mingles and intermixes with combustible contaminants as its passes through the exhaust pipe and muffler, an after burner disposed downstream from the exhaust manifold and having zones of turbulence of gas passing through same, a plurality of spark plugs, each disposed adjacent a corresponding one of said zones, and a voltage vibrating type coil for providing continuous sparking across the gaps of said plugs for effecting ignition of the combustibles and the air admixed with same.

Another object of this invention is to provide an apparatus as aforedescribed including a by-pass conduit between the inlet and outlet of said pump, an anti-backfire valve in the outlet and a series connected check valve between the anti-backfire valve and point of delivery of the air to the exhaust gas.

Another object of this invention is to provide an apparatus as aforedescribed wherein said coil is supplied with primary voltage from the "high" side of the generator (rather than the "low" side) thereby to increase the coils' secondary voltage up to as much as 24,000 volts and produce sparking energy in excess of its designed sparking energy.

Another object of this invention is to provide an apparatus as aforedescribed wherein said afterburner is provided with a transverse baffle between its ends having angularly spaced apertures therein adjacent its periphery, the spark plugs being disposed in the path of gas passing through the apparatus.

Another object of this invention is to provide an apparatus as aforesaid wherein the spark plugs are located adjacent said apertures but downstream thereof thereby further minimizing conditions tending to cause back pressure in the exhaust system.

Another object of this invention is to provide an apparatus as aforedescribed including a pair of oppositely disposed spark plugs ahead of said baffle and another like pair rearwardly of same.

Another object of this invention is to provide a method of combusting the contaminants contained in the exhaust gas of an internal combustion engine comprising the steps of delivering pressurized air into said exhaust gas to produce a mixture thereof, delivering said mixture to a combustion chamber, creating a plurality of zones of turbulence within said combustion chamber thereby further intermixing said air and exhaust gase, and continuously producing electrical sparks within said chamber adjacent said zones of turbulence thereby combusting said contaminants thereat.

Another object of this invention is to provide a method as aforesaid including continuously producing electrical sparks within said mixture outside of said combustion chamber.

Further objects, advantages and salient features will become more apparent from the detailed description to follow, the appended claims, and the accompanying drawing to be now briefly described.

BRIEF DESCRIPTION OF THE DRAWING

FIG. PA diagrammatically illustrates a readily available prior art engine driven air pump system.

DESCRIPTION OF THE PREFERRED EMBODIMENTS

Figure 1:
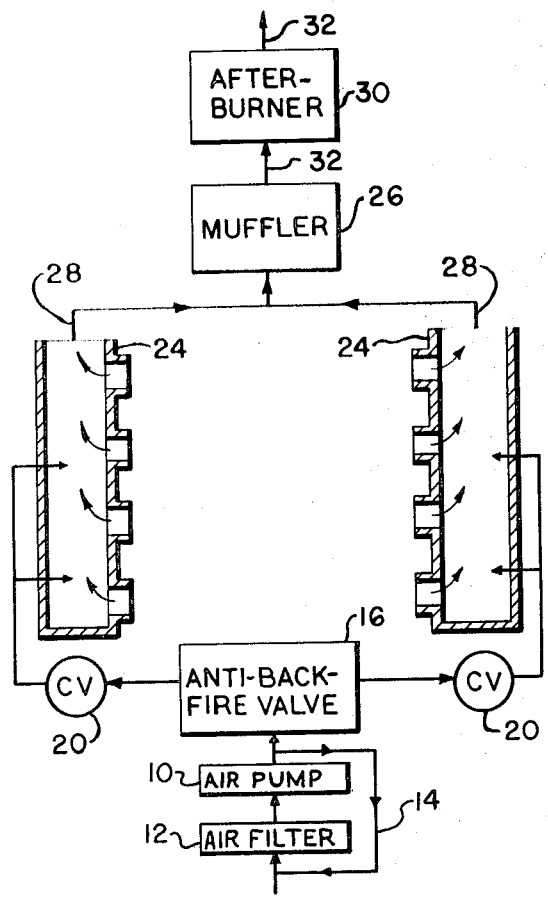
FIG. 1 diagrammatically illustrates the subject of the invention.

Referring now to the drawing, and first to FIG. PA, the conventional air pump system referred to, comprises a positive displacement air pump 10, driven by the engine by a V-belt (not shown), which receives ambient air through an air cleaner or filter 12 and delivers air at elevated pressure, a suitable pressure controlled by-pass 14 being provided to by-pass air back to the pump inlet and maintain a desired outlet pressure. As illustrated, the system is for a V-8 engine and the outlet air is delivered through an anti-backfire valve 16 where it divides and is delivered to air manifolds 18, 18, via check valves 20, 20 the manifold communicating with air injection tubes 22, each adapted to inject air into the exhaust manifold 24 adjacent the exhaust valve of each cylinder. The anti-backfire valve 16 is operated by intake manifold pressure and prevents a backfire to the carburetor, also conventional in such system. The check valves 20, 20 also cooperate with the anti-backfire valve 16 to prevent backfire to the carburetor and, thus, serve as an additional safety feature.

Referring now to FIG. 1, which also illustrates a V-8 engine with a single muffler 26, the air system is generally the same as that previously descrived in connection with FIG. PA with the exception that the air delivered to each exhaust manifold 24 is by a pair of nozzles rather than four such nozzles. Thus, a total of four such nozzles are eliminated Further, a reduced amount of air is delivered to the exhaust manifold, it having been discovered that, due to the intermixing occurring as the gas passes through the zones of turbulence in combination with the use of continuous sparking thereat, excellent results are obtainable without excess quantities of air.

Figure 2:
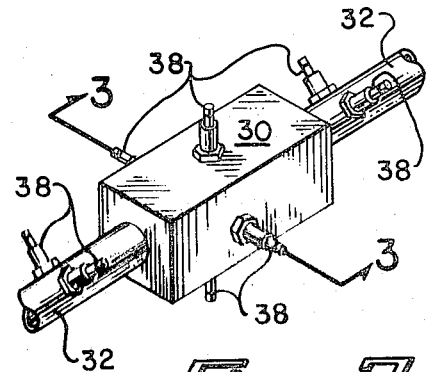
FIG. 2 is an isometric view of a preferred embodiment of an afterburner constructed in accordance with this invention.
Figure 3:
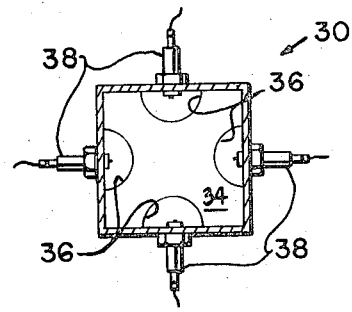
FIG. 3 is a central transverse section through FIG. 2.
Figure 4:
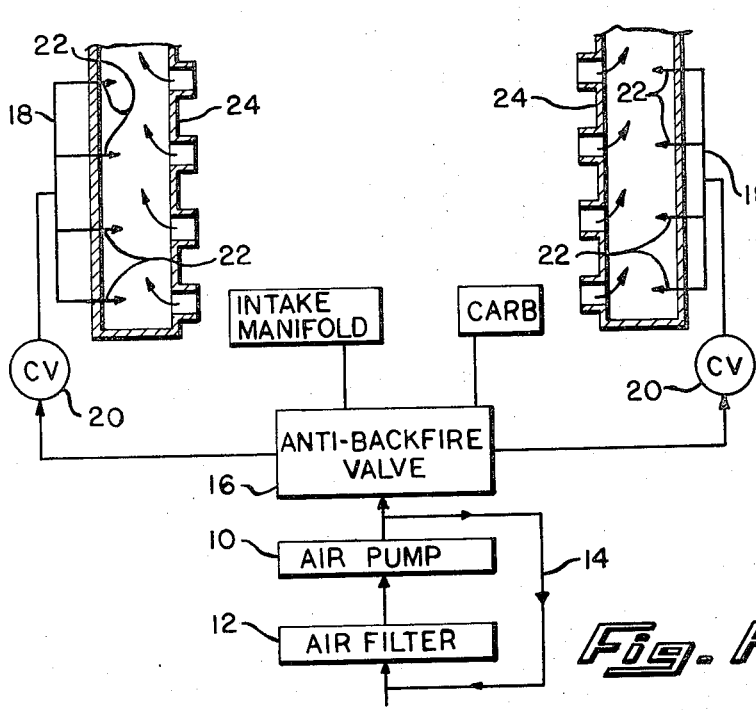
FIG. 4 diagrammatically illustrates a vibrating type coil and the manner of connecting same to the afterburner spark plugs.
Figure 4:
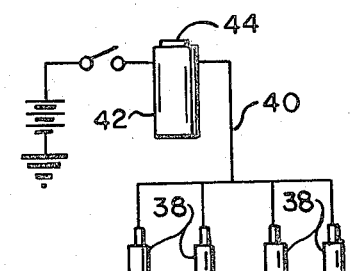

The after burner 30, best shown in FIGS. 2 and 3, comprises a sheet metal casing having apertured end walls for receiving intermediate ends of the tail pipe 32 and is provided with a central transverse baffle 34 having arcuately shaped apertures or cut-outs 36, adjacent its periphery, the baffle 34 dividing the after burner 30 into two tandem chambers which communicate therebetween via said cut-outs 36. Four spark plugs are mounted in said after burner and connected by a common lead wire 40, connected to the high voltage output of coil 42, provided with vibrating breaker points 44. The plug gaps may be of the order of 0.06 inches or more (up to 0.25 inches depending upon the amount of available voltage) and, as will be apparent, due to the nature of the coil, the sparks across the gaps are continuous, as distinguished from intermittent as in conventional ignition system employing a pair of breaker points and a high voltage distributor. Each of the four spark plugs is disposed adjacent a corresponding one of said cut-outs 36. The zones of turbulence are created by the mixture of the exhaust gases and pressurized air added thereto passing therethrough thereby intimately intermixing same. By subjecting each zone of turbulence to a continuous spark, substantially complete combustion of all of the combustible contaminants contained in the exhaust gas is effected.

As shown in FIG. 2, a pair of spark plugs 38 is also mounted in the tail pipe 32 ahead and rearwardly of said after burner 30 taken with respect to the direction of gas flow therethrough. The use of these spark plugs at these locations further enhances complete combustion of the combustible contaminants contained in the exhaust gas.

Figure 5:
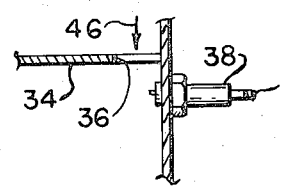
FIG. 5 is a cross-sectional view of another embodiment of an afterburner constructed in accordance with this invention.

The further minimization of conditions causing back pressure within the exhaust system is achieved by locating the spark plugs adjacent said cut-outs 36 but immediately downstream thereof as shown in FIG. 5 wherein the arrow 46 represents the direction of gas flow through said afterburner 30.

Gas analysis tests have been conducted with and without ignition at the afterburner and it has been found that the combustible pollutants have been materially reduced with ignition. In all probability, accordingly, it would appear that the temperature of the exhaust manifolds where air is admitted is not sufficiently high to support combustion within the exhaust pipe. With this premise it would follow that combustion does not occur along the exhaust pipe or within the muffler since these members rapidly conduct or radiate heat to ambient air thus materially cooling the exhaust gas by the time it reaches the afterburner. It thus follows that the sparks at the afterburner cause combustion of the relatively cold combustibles and the added air which otherwise would not occur in the absence of the sparks.

From the foregoing it will be readily appreciated that an apparatus for reducing the emission of pollutants in the exhaust gas from an internal combustion engine which may be easily and quickly incorporated in newly constructed internal combustion engines as well as retro-fitted into existing internal combustion engines, has been described. Further, the foregoing may be accomplished at reasonable expense. The apparatus of this invention is highly efficient. For example, the results of two analyses of exhaust gases passing through the outlet of an apparatus constructed in accordance with this invention are as follows:

| Gas | 6-Cylinder Engine | V-8 Engine |
|---|---|---|
| Carbon Dioxide ($CO_2$) | 6.7% | 7.3% |
| Oxygen ($O_2$) | 6.3% | 5.6% |
| Carbon Monoxide (CO) | 0.6% | 0.4% |

Obviously many modifications and variations of the present invention are possible in light of the above teachings. For example, the apparatus of this invention may be used on any size of gasoline or diesel engine regardless of the number of cylinders, also, the afterburner may be located upstream of said muffler. It is therefore intended to be understood that within the scope of the appended claims the invention may be practiced otherwise than as specifically described.

I claim:

1. Apparatus for combusting the combustible contaminants contained in the exhaust gas of an internal combustion engine and including a conventional exhaust manifold, exhaust pipe and muffler comprising:

a. an engine driven air pump for delivering air to the exhaust manifold;
   b. an afterburner disposed downstream from the muffler and having apertured end walls, said afterburner having a transverse baffle between its end walls with spaced apertures in said baffle adjacent its periphery whereby gas passing through said afterburner passes through said apertures in said baffle;
   c. a first plurality of spark plugs, each disposed adjacent a corresponding one of said apertures in said baffle;
   d. a second plurality of spark plugs positioned adjacent to and outside said apertured end walls of said afterburner; and
   e. a vibrating type coil for providing continuous sparking across the gaps of said plugs for effecting ignition of the combustibles and the air admixed with same for substantially complete combustion of same.

2. Apparatus in accordance with claim 1 including a third plurality of spark plugs positioned adjacent to and outside said apertured end wall of said afterburner opposite that of said apertured end wall adjacent to said second plurality of spark plugs.

3. Apparatus for reducing the emission of pollutants contained in the exhaust gas from an internal combustion engine having a conventional exhaust manifold and exhaust pipe, comprising:

a. an engine driven air pump for delivering air to the exhaust manifold;
   b. an afterburner connected to said exhaust pipe and having apertured end walls, said afterburner having a transverse baffle between its end walls with spaced apertures in said baffle adjacent its periphery whereby gas passing through said afterburner passes through said apertures in said baffle;
   c. a first plurality of spark plugs, each disposed adjacent a corresponding one of said apertures in said baffle;
   d. a second and third plurality of spark plugs positioned adjacent to and outside said apertured endwalls of said afterburner, said second plurality of spark plugs being adjacent one end wall of said afterburner and said third plurality of spark plugs being adjacent the other end wall of said afterburner; and
   e. a vibrating type coil for providing continuous sparking across the gaps of said first, second and third plurality of plugs for effecting ignition of the combustibles and the air admixed with same.

* * * * *